Jan. 20, 1953  H. M. SCHMITT  2,625,911
AIR MOTOR CONTROLLER WITH SELF-BALANCING POTENTIOMETER
Filed March 29, 1949  2 SHEETS—SHEET 1

*INVENTOR.*
HENRY M. SCHMITT
BY
*Arthur H. Swenson*
ATTORNEY.

Jan. 20, 1953  H. M. SCHMITT  2,625,911
AIR MOTOR CONTROLLER WITH SELF-BALANCING POTENTIOMETER
Filed March 29, 1949  2 SHEETS—SHEET 2

*INVENTOR.*
HENRY M. SCHMITT

BY Arthur H. Swanson

ATTORNEY.

Patented Jan. 20, 1953

2,625,911

UNITED STATES PATENT OFFICE 2,625,911

AIR MOTOR CONTROLLER WITH SELF-BALANCING POTENTIOMETER

Henry M. Schmitt, Glenside, Pa., assignor to Minneapolis-Honeywell Regulator Company, Minneapolis, Minn., a corporation of Delaware Application March 29, 1949, Serial No. 84,206

3 Claims. (Cl. 121—41)

This invention relates to controllers of the type which include a potentiometer as a part thereof. In such controllers, a measuring instrument senses variations in a variable in response to which variable the control is to be exercised. The measuring instrument converts these variations to a variable voltage which is compared to the stable voltage of a primary cell. Any difference between the voltage of the measuring instrument and the voltage of the primary cell is applied to a slide wire and may be utilized to cause movement of a motor to adjust the slide wire and rebalance the potentiometer circuit. Such controllers are very accurate but their accuracy is limited due to variations, which may occur over a period of time, in the voltage of the primary cell. The factors causing this variation are unpredictable but include the ambient temperature. To insure that the voltage of the primary cell is at its calibrated value, a resistance in series with the primary cell is adjusted periodically to bring the potential drop across the slide wire of the potentiometer to some standard value in order to maintain the accuracy of the instrument. This adjustment of resistance is known as "standardizing" and is performed either manually or automatically. A standardizing switch is provided which disconnects the potentiometer circuit from the primary cell, which is normally connected to the potentiometer network, and connects the potentiometer circuit to a standard cell, which affords a standard source of voltage for comparison during standardizing.

Such controllers, particularly circular chart, electronically operated controllers work on a narrow throttling range. In the case of an oil-fired, high temperature installation, during standardizing, particularly during manual or "push button" standardizing, the final control element, i. e. the valve controlling the supply of fuel to the furnace, may close and then open rapidly. In such event the fuel oil squirts into the hot furnace and may cause a big, explosive puff. If the furnace flame is extinguished by this puff or otherwise, in cases in which there is provided a safety device responsive to the existence of a flame and operative upon the extinguishment of the flame, the safety device may cause the final control valve to close. Such closure of the final control valve causes attendant difficulties due to the necessity of reopening it.

A primary object of this invention is to provide an interlock between the standardizing switch and the supply of power to the motor driving the final control element so that the final control element is locked throughout the standardizing operation, in the position which the final control element had assumed prior to the initiation of standardizing.

A more specific object of this invention is to provide such an interlock comprising an electric switch connected to or ganged with the manually or automatically operated standardizing switch, a solenoid or like electric motor controlled from a source of electric power connected in circuit with said switch, and a valve in the air line which leads from the air-operated controller to the air-operated motor which moves a final control valve or like element.

One type of such controller comprising: a measuring element, such as a thermocouple; a self-balancing potentiometer for sensing any change of voltage generated by the thermocouple in response to the heat to which it is exposed; an electric circuit wherein the unbalanced D. C. current of the potentiometer is transformed into a pulsating current of one phase or of opposite phase depending upon the sense of unbalance of the potentiometer circuit; an amplifier which strengthens the pulsating current; a reversible electric motor operated by the amplified, pulsating current in one direction or the other so that the motor rebalances the potentiometer circuit; an indicating, recording and or controlling mechanism operated by the motor; an air-operated controller having a flapper valve also operated by the rebalancing motor which controller, in turn, controls the operation of an air-operated motor connected to a final control element, for example, a valve controlling the supply of fuel to a furnace in which the measuring instrument is located. The voltage generated by the thermocouple or other measuring instrument is compared to the voltage of a primary cell by applying both voltages to a slide wire.

Figure 1:
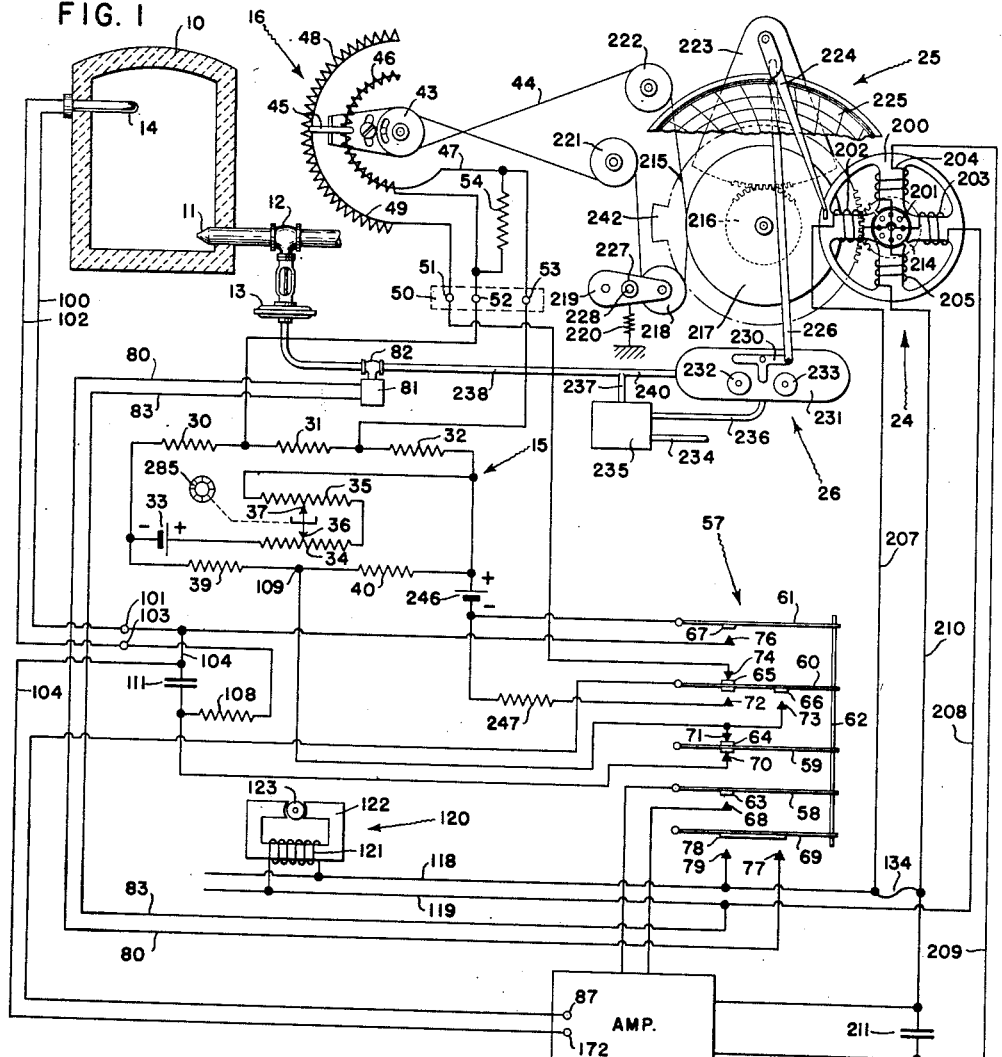
Fig. 1 is a schematic illustration of the measuring and control apparatus.

Fig. 1 schematically illustrates a self-balancing potentiometric controller for measuring, indicating, recording and controlling the value of a condition, for example, the temperature in a furnace 10. Furnace 10 may be heated by a burner 11 controlled by a valve 12 driven by an air-operated motor 13.

A thermocouple 14 responsive to the temperature within the furnace 10 operates in conjunction with a potentiometer network, generally designated 15, and a slide wire assembly, generally designated 16, to form a self-balancing potentiometer device. Upon a change in temperature within the furnace 10, an unbalanced direct current (D. C.) is produced in one direction or in the opposite direction depending upon the sense of unbalance of the potentiometer system. This D. C. is applied to an amplifier unit, generally indicated 17, having a vibrator or equivalent device, a transformer, and amplifying electronic tubes.

The D. C. supplied to the amplifier 17 is converted by the vibrator into pulsating current of one phase or of opposite phase depending upon the sense of unbalance of the potentiometer system. This pulsating current is detected and amplified by the transformer and is further amplified by the amplifying electronic tubes. The output from the amplifying tubes is supplied to motor-driving electronic tubes for operating, in one direction or the other, a reversible electric motor, generally designated 24. Reversible motor 24 operates a driving mechanism, generally designated 25. The drive mechanism operates the slide wire assembly 16 to rebalance the potentiometer system and also operates indicating and recording means for indicating and recording the temperature existing within the furnace 10. The drive mechanism 25 also operates a controller, generally designated 26, which may take the form of an air-operated controller such as is illustrated in U. S. Patent 2,125,081, granted July 26, 1938, to C. B. Moore. This controller 26 operates to control the valve 12 to maintain the temperature within the furnace 10 at the desired normal value.

The potentiometer network 15 may comprise three resistances 30, 31 and 32 connected in series. These resistances are preferably formed of manganin wire having substantially no temperature resistance coefficient and are used for calibration. Connected in parallel with resistances 30, 31 and 32 is a primary cell 33, which may be a dry cell, and a dual vernier rheostat comprising movable resistances 34 and 35 and electrically-connected, stationary, sliding contacts 36 and 37, associated respectively with the resistances 34 and 35. The dual vernier rheostat may be manually operated by a knob 285. A pin 38 has a direct mechanical connection with the contact 36 and a lost motion connection with the contact 37. Upon initial movement of the knob 285, the resistance 34 is first moved and then the resistance 35 is moved thereby providing vernier adjustment. This is explained in greater detail in connection with Fig. 2.

Cell 33 and the rheostat are connected in series with each other. Resistances 34 and 35 may be of copper or other material having a positive temperature resistance coefficient for compensating for temperature changes in the cell 33. Also connected in parallel with resistances 30, 31 and 32 are two resistances 39 and 40 which, in turn, are connected in series with each other. Resistance 39 is preferably made of copper or other material having a positive temperature resistance coefficient. Resistance 40 may be formed of manganin having substantially no temperature resistance coefficient. Resistance 39 compensates for temperature changes at the cold junction of the thermocouple 14, it being so connected into the network that the voltage drop across it is added to the thermocouple E. M. F. Resistance 40 is utilized primarily for standardizing purposes and has a resistance value such that the voltage drop across it is equal to the voltage produced by the standard cell 246.

Slide-wire assembly 16 may include a cable drum 43 suitably rotated by the drive mechanism 25 through a cable 44. The term "cable" is used in a generic sense to cover similar arrangements such as wire, violin string, rope, cord, etc. The cable drum 43 is provided with an adjustment for adjusting the diameter or circumference thereof. The cable drum 43 operates through an adjustable connection to move a contactor 45. The contactor 45 engages a slide-wire in the form of a resistance wire 46 which is space wound around an insulated core 47. Preferably the slide-wire 46 and the core 47 are formed of the same material such as manganin wire having substantially no temperature resistance coefficient. The contactor 45 also engages a collector bar in the form of a resistance wire 48 space wound around a core 49 and completely electrically conductive with respect thereto throughout their lengths. Preferably, the resistance wire 48 and the core 49 are formed of the same material, such as manganin wire, as the resistance wire 46 and core 47. The slide-wire assembly is provided with a terminal block 50 having terminals 51, 52 and 53. The collector bar 48 is connected to the terminal 51. One end of the resistance wire 46 is connected to the terminal 52 and one end of the core 47 is connected to the terminal 53, the other ends of the resistance wire 46 and the core 47 being connected together. Connected across the slide-wire 46 and core 47, that is in shunt with the slide-wire 46, is a resistance 54 also formed of manganin wire. The terminals 52 and 53 are connected to the ends of the resistance elements 31 of the potentiometer network 15 and thereby the slide-wire resistance 46, the resistance 54 and the resistance 31 are all connected in parallel.

A two position switch generally designated at 57 is utilized for performing two functions, namely, for connecting the potentiometer circuit network for normal operation (run) and for standardizing the potentiometer system (standardize). Schematically, this switch 27 may comprise switch arms 58, 59, 60 and 61 and 69 electrically insulated from each other and all operated by a common operating member 62. The switch arms 58 and 59 carry contacts 63 and 64, respectively. The switch arm 60 carries contacts 65 and 66 and the switch arm 61 carries contact 67. Contact 63 engages a contact 68 when the switch 57 is moved to the standardize position. When switch 57 is in the run position the contact 63 does not engage contact 68. When the switch 57 is in run position the contact 64 engages both contacts 70 and 71. When the switch is moved to the standardize position contact 64 disengages contact 71. Contact 65 engages contact 74 when the switch 57 is in run position. When the switch 57 is moved to standardize position, contact 65 disengages contact 74 and contacts 65 and 66 engage contacts 72 and 73, respectively. When the switch 57 is in the run position contact 67 does not engage contact 76. Contact 67 engages contact 76 only when the switch 57 is moved to standardize position.

For the purposes of illustration it is assumed that the thermocouple 14 is an iron-constantan thermocouple. The lead 100 extending from the iron element of the thermocouple to the positive cold junction terminal 101 is an iron lead. The lead 102 leading from the constantan element of the thermocouple to the negative cold junction terminal 103 is made of constantan. The hot junction of the thermocouple is, therefore, in the furnace 10 and the cold junction is at the cold junction terminals 101 and 103. The positive cold junction terminal 101 is connected to the contacts 76 and 67 of the switch 57. The contact 74 which normally engages the contact 65 is connected to the terminal 51 and hence to the collector bar 48 of the slide-wire assembly 16. Accordingly, the positive lead of the thermocouple is connected through the transformer and the vibrator to the collector bar 48 of the slide-wire assembly 16 when the switch 57 is in the run position.

The cell 33 operates to produce an E. M. F. between the contactor 45 of the slide-wire assembly 16 and the point 109 in the potentiometer network 15 which opposes the E. M. F. produced by the thermocouple 14 and the value of the cell E. M. F. produced between these points is regulated by the position of the contactor 45 along the slide-wire resistance 46. As the contactor 45 of the slide-wire assembly is moved in a clockwise direction the cell E. M. F. between the contactor 45 and the point 109 is increased and as the contactor 45 is moved in a counter-clockwise direction the cell E. M. F. is decreased. When the potentiometer system is balanced the E. M. F. produced by the cell between the contactor 45 and the point 109 is equal and opposite to the E. M. F. produced by the thermocouple 14 and, therefore, no current flows in the thermocouple circuit.

Upon an increase in temperature within the furnace 10 the E. M. F. produced by thermocouple 14 becomes greater than the E. M. F. produced by the cell 33 between the contactor 45 and the point 109 which causes a D. C. current flow from the positive cold junction terminal 101 through wire terminal 104 to the terminal 172 of the transformer 19 to the terminal 87. From the terminal 87 the D. C. current flows through contacts 65 and 74 of the switch 57, terminal 51 of the slide-wire assembly, collector bar 48, contactor 45, slide-wire resistance 46, potentiometer network 15 to 109, and then through contacts 71, 64 and 70 of the switch 57, resistance 108, checking terminal 107, jumper 106, and checking terminal 105 to the negative cold junction terminal 103. This produces a D. C. current in one direction which is detected and amplified by the amplifier 17 to operate the reversible motor 24 which through the drive mechanism 25, cable 44 and cable drum 43 moves the contact 45 in a clockwise direction to increase the cell E. M. F. between the contactor 45 and the point 109 to oppose equally the E. M. F. developed in the thermocouple. When this occurs the flow of D. C. current is stopped and the potentiometer system becomes balanced.

Upon a decrease in temperature within the furnace 10 the E. M. F. produced by the thermocouple 14 becomes less than the E. M. F. produced between the contactor 45 and the point 109 by the cell 33. This causes a D. C. current to flow in the opposite direction from the contactor 45 through collector bar 48, terminal 51 of the slide-wire assembly 16, contacts 74 and 65 of the switch 57, to terminal 87 of the vibrator 17. This D. C. current then flows from the terminal 172 through positive checking terminal 104, positive cold junction terminal 101, thermocouple 14, negative cold junction terminal 103, negative checking terminal, jumper, negative checking terminal, resistance 108, contacts 70, 64 and 71 of the switch 57 and point 109 through the potentiometer network 15 to the contactor 45 of the slide-wire assembly 16. This flow of D. C. current is detected and amplified by the amplifier 17 to operate the reversible motor 24 in the opposite direction which in turn operates through the drive mechanism 25, cable 44 and cable drum 43 to move the contactor 45 of the slide-wire assembly 16 in a counter-clockwise direction. This decreases the E. M. F. produced by the cell 33 between the contactor 45 and the point 109 to a value which equally opposes the E. M. F. produced by the thermocouple 14 whereupon the potentiometer system again becomes balanced and no D. C. current flows.

Accordingly, upon a change in temperature within the furnace 10 an unbalanced D. C. current is caused to flow in one direction or the other depending upon whether the furnace temperature increases or decreases. This unbalanced D. C. current flow is detected and amplified by the amplifier 17 to operate the reversible motor 24 which in turn operates through the drive mechanism 25 and the slide-wire assembly 16 to reduce the unbalanced D. C. current flow to zero. The positions of the contactor 45 of the slide-wire assembly 16 and of the indicating, recording and controlling parts mechanically coupled thereto represent the actual temperature value existing within the furnace 10.

The motor 24 is, therefore, rotated in one direction or the other as the potentiometer circuit is unbalanced in one direction or the other and the speed of operation of the motor in either direction is dependent directly upon the amount of potentiometer unbalance. As the potentiometer circuit is restored to balance following an unbalance thereof, the braking action on the motor is increased so that rotation of the motor is rapidly stopped when the potentiometer is rebalanced without any "hunting."

When the motor is operated at maximum speed the inductance of the motor control winding is increased, for at this time the D. C. current flow through the motor control winding is at a minimum. Also, at this time the alternating current flowing through the motor control winding is completely a 60 cycle alternating current instead of the 120 cycle current flowing through the motor control winding when the potentiometer is balanced and the motor is stationary. Due to this decrease in frequency and due to the increase in inductance in the motor control winding when the motor is operating at a maximum speed, the condenser 211 connected in parallel with the motor control winding still provides a parallel resonant circuit so that the impedance offered by this parallel resonant circuit is substantially resistive to maintain the plate voltage in phase with the plate current. As pointed out above a resonant condition occurs when the motor is stationary with the potentiometer balanced so that under that condition the plate voltage and plate current are also in phase. Proceeding from the condition wherein the motor is stationary to a condition wherein the motor is operating at maximum speed the circuit formed by the condenser 211 being connected in parallel with the motor control winding remains substantially resonant so that the plate current and the plate voltage are substantially always in phase.

As the rotor 201 of the motor 24 rotates the flux produced by the power windings 202 and 203 is distorted by the rotor rotation to cause some of the flux produced by the power windings to link the control windings 204 and 205. This induces additional voltage in the control windings 204 and 205 which is of the same phase and frequency as the voltage normally produced therein to assist the voltage in the control windings 204 and 205. This induces current in the control windings through the low resistance local path of the parallel resonant circuit thereby giving a relatively large current flow even though only a few turns of the control windings are linked by the distorted flux. The greater portion of the current and hence the power for the control windings when the motor is operating at maximum speed is induced by this transformer action so that the tubes may only conduct a relatively small portion of the total current or power required to energize the control windings. The amount of current induced by transformer action is proportional to the speed of rotation of the rotor. This action tends to increase the life of tubes.

The motor rotor 201 operates a pinion 214 which drives a gear 215. The gear 215 carries a gear 216 and a cable drum 217. The cable 44 which drives the contactor 45 of the slide-wire assembly 16 is fastened to the cable drum 217 and passes over a tension pulley 218 carried by a lever 219 and urged downwardly by a spring 220. The cable 44 also passes over pulleys 221 and 222 and is fastened to cable drum 43. The spring 220 urging the pulley 218 downwardly maintains a predetermined tension in the cable 44 so that the relative positions of the cable drum 217 and the cable drum 43 will always remain fixed. The lever 219 is provided with an enlarged hole 227 through which extends a stationary pin 228, the pin cooperating with the hole to act as a stop for limiting the movement of the lever 219. The gear 216 operates a gear sector 223 which in turn operates a pen arm 224 for recording the temperature values on a chart 225 and in the case of a control instrument also operates an arm 226 for controlling the control device 26. The chart 225 is rotated at a constant speed by the chart drive motor 120.

The arm 226 operates a flapper mechanism 230 carried by the body portion 231 of the control device 26. The control device 26 is equipped with dials 232 and 233 for adjusting the throttling range and the rate of reset of the control device. Air under pressure is supplied through a pipe 234 to a pneumatic relay mechanism 235 and a pipe 236 controlled by the control device 26 regulates a pilot valve contained in the relay mechanism to produce a pressure in a pipe 237 in accordance with the temperature condition existing within the furnace 10. The pressure in the pipe 237 is conducted through a pipe 238 to a pneumatic motor 13 which operates the valve 12 and the pressure is also conducted through a pipe 240 to the control device 26 in order to provide the follow-up and reset action in the control device 26.

Upon an increase in temperature within the furnace 10 the motor 24 is operated in the counter-clockwise direction to drive the gear 215 in a clockwise direction. Rotation of the gear 215 in the clockwise direction causes the contactor 45 of the slide-wire assembly 16 to rotate in a clockwise direction to rebalance the potentiometer system. Clockwise rotation of the gear 215 also causes the gear sector 223 and the pen 224 to rotate in a counter-clockwise direction to record on the chart 225 the increase in temperature which has taken place within the furnace 10. Counter-clockwise rotation of the gear sector 223 operates through the arm 226 and flapper assembly 230 to actuate the control device 26 to position the relay mechanism 235 to decrease the pressure transmitted to the pneumatic motor 13 of the valve 12. This moves the valve 12 toward the closed position to decrease the supply of fuel to the furnace 10 for the purpose of reducing the temperature of the furnace to the desired normal value. The decrease in pressure transmitted to the diaphragm motor 13 is also transmitted to the control device 26 to provide a follow-up action for causing the valve 12 to be positioned in accordance with the temperature within the furnace. This decrease in pressure transmitted to the control device 26 also operates through the reset mechanism thereof to additionally position the valve 12 towards a closed position if the temperature change is caused by a change in temperature load in the furnace extending over a substantial period of time. Upon a decrease in temperature within the furnace 10 the opposite action takes place, the contactor 45 of the slide-wire assembly 16 being moved in a counter-clockwise direction, the pen arm 224 being moved in a clockwise direction to record on the chart 225 the decrease in temperature and the control device 26 being actuated to cause proportionate opening of the valve 12 to increase the supply of fuel to the furnace 10 for restoring the furnace temperature to the desired value.

The gear 215 is formed with an abutment 242 which engages the drive pinion 214 when the gear 215 is rotated to either extreme position. In engaging the drive pinion 214 the abutment 242 stalls the motor 24 and prevents over-travel of the contactor 45 of the slide-wire assembly 16 and over-travel of the pen arm 224. Due to the relatively high inductive reactance to resistance ratio of the motor 24 and due to the lack of transformer action when the motor is stalled, it is found that when the motor is thus stalled the current flow through the motor is less than when it is actually running so that the motor 24 does not heat up under these stalled conditions. By reason of this arrangement the use of limit switches or equivalent devices for stopping operation of the motor 24 is entirely eliminated.

In order to standardize the potentiometer circuit, that is, adjust the dual vernier battery rheostat to maintain a predetermined potential across the slide-wire assembly, the three-way switch 57 is moved downwardly to the standardize position. Engagement of contact 67 with contact 76 connects the negative end of the standard cell 246 through wire 164 to the terminal 172 of the transformer. Movement of the contact 65 out of engagement with the contact 74 breaks the connection from the slide-wire assembly to the terminal 87 of the vibrator and engagement of contact 65 with contact 72 connects the negative end of the standard cell 246 through resistance 247 to the terminal 87 of the vibrator 18. Movement of the contact 66 into engagement with the contact 73 connects the negative end of the standard cell 246 through resistance 247 to the point 109 of the potentiometer circuit. Movement of the contact 64 out of engagement with the contact 71 breaks the connection between the negative thermocouple lead and the point 109 of the potentiometer circuit. In other words, when the three-position switch 57 is moved to the standardize position, the collector bar 48 of the slide-wire assembly 16 and the thermocouple 14 are disconnected from the circuit and the amplifier 17 including the vibrator and the transformer is connected across the resistance 247 which in turn is connected in series with the negative end of the standard cell 246 and the point 109 of the potentiometer circuit.

The voltage produced by the standard cell opposes the voltage drop across resistance 40 produced by the cell 33 and any difference in the voltages causes a current flow through the resistance 247 in one direction or the other depending upon which voltage is greater. This current flow through the resistance 247 is detected and amplified by the amplifier 17 to cause the motor 24 to rotate in one direction or the other. This rotation of the motor 24 indicates that the current produced by the cell 33 is different than that produced by the standard cell 246. The dual vernier rheostat in series with the cell 33 is Vernier rheostat in series with the cell 33 is then adjusted until rotation of the motor 24 ceases. When this occurs the current produced by the cell 33 produces a voltage drop across the resistance 40 which is equal to the voltage produced by the standard cell 246 and the potentiometer circuit has been standardized. Following this standardization the switch 57 is then returned to the run position for normal operation.

Figure 2:
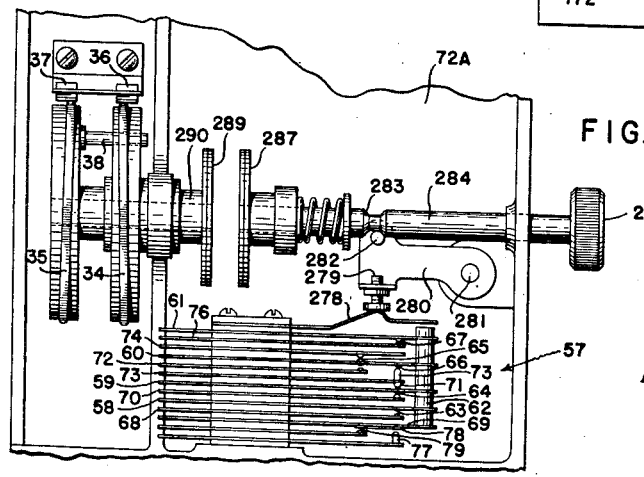
Fig. 2 is a side elevation or outside view of a portion of the controller showing the manually-operated standardizing switch.

The manual adjustment of the dual vernier rheostat is accomplished in a manner best shown in Fig. 2. The standardizing resistance, which is shown diagrammatically in Fig. 1, is shown in detail in Fig. 2 as consisting of a vernier rheostat which is made up of a fine resistance 35 and a coarse resistance 34 which resistances are mounted on a shaft 290 that extends to the left from the wall of the mechanism-supporting casting 72A. The arrangement is, that the fine resistance is adjusted directly and the coarse resistance is rotated by the fine resistance by means of a pin 38 which is attached to the fine resistance 35 and extends to the right therefrom through a slot that is formed in the disc supporting the coarse resistance 34. The resistances are engaged by a pair of electrically connected contacts 36 and 37 which serve the purpose of connecting these resistances in the potentiometer circuit and also, by their frictional engagement with the resistances serve to prevent accidental rotation of the resistances.

It was pointed out above in the description of the wiring diagram that the standardizing switch 57 could be moved to bring contacts 67 and 76 and contacts 63 and 68 into engagement with each other in order to standardize the instrument. The manner in which this is accomplished is shown in Figure 2.

Mounted on the instrument casing 72A, adjacent and above the switch 57, is a leaf spring 278 that is engaged and moved by an adjustable screw 279 which, in turn, is mounted on a lever 280. In order to move the switch 57 to its standardizing position, the lever 280, which is pivoted at 281 is moved in a counter-clockwise direction to bring the leaf 278 into engagement with the button or common operating member 62 by engagement between a pin 282 that projects from the lever 280 and a cam surface 283 that is formed on a shaft 284. This shaft is journaled for axial and rotative movement in the frame 72A in suitable bearings. Shaft 284 may be rotated and moved axially by means of knob 285 on its right hand end, in standardizing the instrument, the knob is moved to the left in Fig. 2 to move the operating button or knob 62 of the switch 57 downwardly. Continued leftward movement of the knob 285 will bring a clutch plate 287 on the left end of the shaft 284 into engagement with a second clutch plate 289 on the shaft 290 of the standardizing rheostat 34—35. After the clutch plates have been connected and the switch 57 has been thrown downwardly, rotation of knob 285 will adjust the resistances 34 and 35 to standardize the instrument.

If the voltage of the primary cell 33 has seriously decreased before the standardizing operation is understaken, connecting the rebalancing motor 24 across the standard cell 246 may cause the final control valve 12 to move to closed position, as it should, but may also permit the final control valve 12 to thereafter reopen to a greater or less extent. Such a reopening of valve 12 would permit a flow of fluid through the nozzle 11 to the hot furnace 10 where the fuel would be ignited with more or less explosive violence. In the case in which the furnace 10 is protected by a light sensitive device, such an explosion might cause the furnace 10 to set down with attendant difficulties in restarting. Such explosions are prevented by the interlock of this invention. This interlock consists of the individual switch contacts 77 and 79 which are mounted adjacent the switch 57 so as to be bridged by the bridging contact 78 mounted on the switch arm 69. Contact 79 is connected directly to the main alternating current lead 118. Switch contact 77, however, is connected by wire 80 to one side of a solenoid 81 or other electric motor. Motor 81 has operating connections with a valve 82 in the conduit 238 which supplies air from the controller 235 to the air-operated motor 13 which drives the final control valve 12. The other side of solenoid 81 is connected by wire 83 with the other alternating current main 119. Thus, it will be seen that when switch 57 is operated to permit standardizing of the instrument in the manner described, solenoid 81 is energized and operates to close valve 82 and thereby lock the air in motor 13. This causes valve 12 to remain in the closed position which it has assumed at that time. Therefore, any danger of admission of fuel to furnace 10 and the consequent hazard of explosion is avoided.

Figure 3:
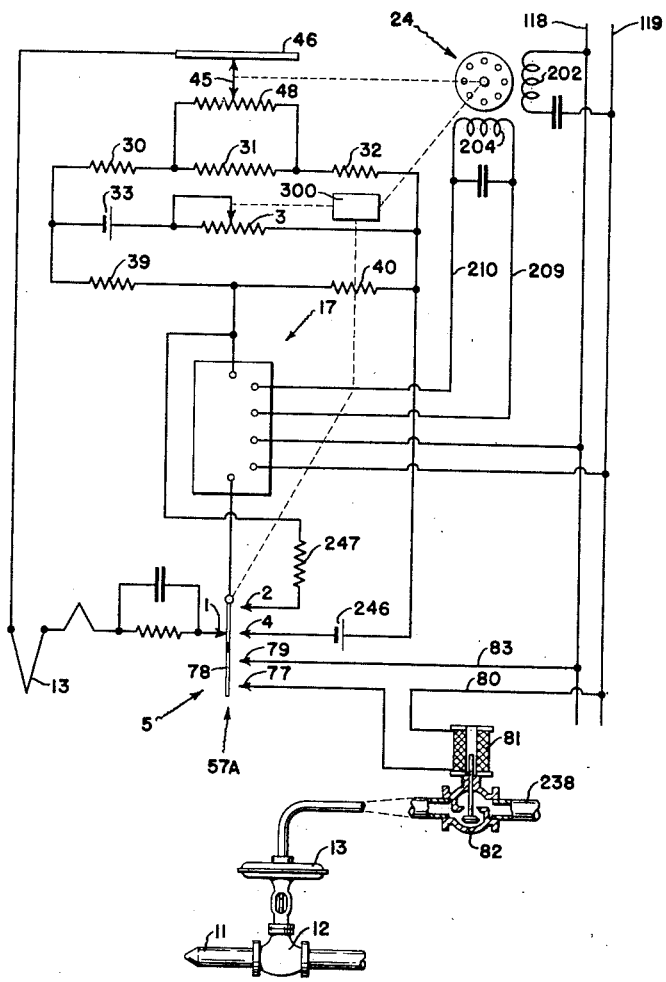
Fig. 3 is an electric circuit diagram of a modified form of controller having automatically, periodically-operated standardizing.
Figure 4:
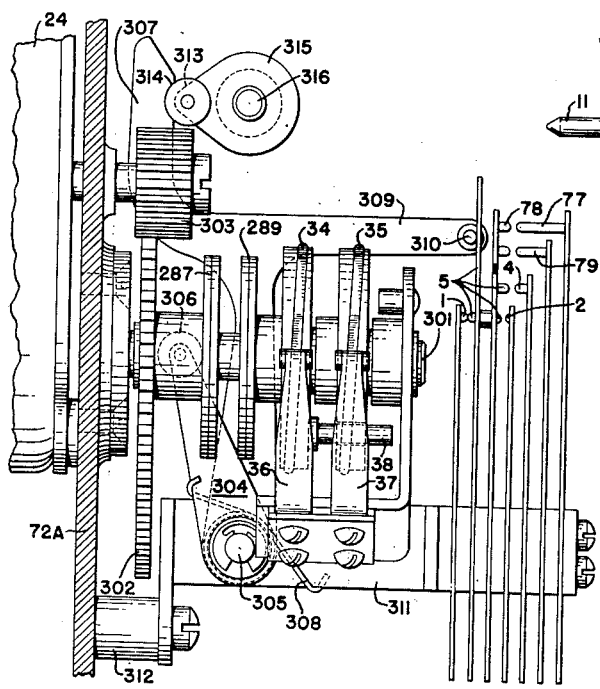
Fig. 4 is a side elevation with parts in vertical cross section of the standardizing switch and the periodically-operated motor therefor.

Figs. 3 and 4 show a modification in which the standardizing operation is performed automatically.

As has been pointed out in connection with Figs. 1 and 2, because of the fact that the output voltage of the cell 33 changes with use and changes with unpredictable factors, such as the ambient temperature to which it is subjected, it is necessary to adjust the variable resistance 3 from time to time in order to maintain the desired calibration of the potentiometer instrument. At such times as the instrument is to be recalibrated or standardized, the movable contact 5 of the switch 57A is shifted out of engagement with the stationary contact 1 and into engagement with contacts 2, 4, 77 and 79 thus effecting disconnection of the thermocouple 13 from the circuit and connection of the standard cell 246 in opposition to the potential drop across the resistance 5. Simultaneously, the movable member 5 of switch 57A engages the stationary contact 2 to connect a resistance 247 in shunt to the input terminals of the electronic device 17. The resistance 247 is utilized for the purpose of desensitizing the electronic device 17 because the opposed potential drops connected to the input circuit of device 17 when the instrument is in its standardizing position are of much greater magnitude than are the opposed potential drops which are impressed upon the input circuit of the device 17 when the instrument is in its normal measuring condition. Consequently, the extreme sensitivity of the electronic device required in the normal measuring condition of the potentiometer is not required nor desired in the recalibrating or standardizing position of the instrument.

Simultaneous with the adjustment of switch member 5 into engagement with contacts 2, 4, 77 and 79, the output shaft of the reversible motor 24 is connected to the variable resistance 3 for effecting adjustment of the latter in accordance with the angular position of said shaft. To this end, a clutch mechanism indicated generally by the reference character 300 is provided between the output shaft of motor 24 and the resistance 3. The clutch mechanism 300 may be of the type disclosed in Patent 2,377,474 issued to A. F. Allwein on June 5, 1945. Such clutch mechanism is illustrated in detail in Fig. 4.

In the normal measuring condition of the potentiometer instrument, the output shaft of the reversible motor 24 is connected to the contact 45 for adjusting the latter along the length of the slidewire resistance 43. The rotation of the reversible motor 24 accomplishing this result does not during this condition of operation produce any adjustment of the variable resistance 3. The clutch mechanism 300 includes time operated mechanism, however, which periodically shifts the movable member 5 of the switch 57A out of engagement with contact 1 and into engagement with the contacts 2, 4, 77 and 79 and simultaneously connects the output shaft of the motor 24 to the variable resistance 3. This is the standardizing condition of the potentiometric instrument. If the potential drop across the resistance 40 is then not exactly equal to the potential of the standard cell 246, indicating that the potentiometric network needs recalibration, the electronic device 17 detects such inequality of the opposed potentials and causes selective energization of the reversible motor 24 for rotation to effect adjustment of the variable resistance 3 in the proper direction to restore the correct calibration condition of the potentiometric instrument. The motor 24 also operates to adjust the contact 45 along the slidewire resistance 48 during this time, but such adjustment in no way affects the standardizing operation inasmuch as the thermocouple circuit is then opened at the switch 57A.

In Fig. 4, is shown the details of the clutch mechanism 300 of Fig. 3. In Fig. 4 the standardizing resistance 3 is shown as consisting of a vernier rheostat which is made of a fine resistance 34 and a coarse resistance 35, which resistances are rotatably mounted on a shaft 301 that extends from the mounting wall 72A which supports the mechanism. The parts are so arranged that the fine resistance is adjusted directly and the coarse resistance is rotated by the fine resistance by means of a pin 33 which is attached to the support for the fine resistance 34 and extends to the right therefrom through a slot which is formed in the resistance 35. The resistances are engaged by a split contact 36—37 which serves the purpose of connecting these resistances in the potentiometric circuit and due to its frictional engagement with the resistance disks also serves to prevent accidental rotation of the latter.

The resistances are adjusted relatively to the contact 36—37 by means of clutch 300 which comprises a driven clutch disk 289 that is formed as a part of the resistance 34, and a driving clutch disk 287 which is also rotatably mounted on the shaft 301, and is attached to a gear 302. The gear 302 meshes with a pinion 303 driven by the motor 24 so that, as the latter rotates, the gear and the driving disk 287 also rotate and at predetermined times when the clutch disks 287 and 289 are in engagement with each other, serve to adjust the resistance 3. Driving disk 287 is moved into or out of engagement with driven disk 289 by means of a lever 304 that is attached to a shaft 305. The upper end of this lever has a roller 306 which engages the left face of the clutch disk 287 to move this disk to the right into engagement with the disk 289, or engages the right face of gear 302 to separate the disks. During the movement of the disk 287, gear 302 will slide along the pinion 303, the latter being wide enough to permit this to take place. The shaft 305 also has attached to it a second lever 307; the two levers and shaft being biased in a clockwise, or clutch closing direction by means of a spring 308. The lever 307 also has an extension 309 projected rearwardly from it which serves, by means of a pin 310, to throw the standardizing switch 57A from the position shown in Figs. 3 and 4 to a position to bring contact 5 into engagement with contacts 2, 4, 77 and 79 whenever the clutch is closed. The switch 57A is shown in Fig. 4 as being of a leaf type, and is mounted on a support 311 which is adapted to be fastened as shown at 312 to the wall 72A of the mounting.

The movable element, generally indicated at 5, of the switch 57 has attached to it a bridging contact 78 which engages a pair of relatively stationary contacts 77 and 79 mounted on leaf spring contacts.

Normally, during the operation of the instrument, the standardizing mechanism parts are in a position shown in Figs. 3 and 4, and are held in that position by means of engagement between a roller 313 and a cut out portion 314 on the upper end of the lever 307. The roller 313 is mounted on a crank 315 that is attached to a shaft 316. This shaft 316 is periodically rotated, by any one of a number of suitable means. Such means, suitable for causing the shaft 316 to make and complete a rotation at regularly recurring intervals are well known to those skilled in the art, and need not be described in detail here since they form no part of the present invention. It is, therefore, only necessary to state here that the shaft 316 is periodically given a complete rotation, during which rotation the standardizing switch 57A is shifted to its standardizing position and the clutch plates 287 and 289 are held together so that the motor 24 is made operative to adjust the resistance 3 if such adjustment is necessary to obtain a balance of the potentiometric system, indicating proper instrument calibration.

During the standardizing operation, motor 24 moves in response to any difference between the voltage of primary cell 33 and the standardizing cell 246 to rebalance resistor 3. In order to prevent the valve 12 from moving in response to this movement of rebalancing motor 24, an interlock is provided between the standardizing switch 57A and the valve 12 controlling the supply of fuel to the furnace nozzle 11. This interlock consists of the bridging contact 78 on the movable member 5 of switch 57A. Contact 78 engages contacts 77 and 79 in the standardizing position of switch 57A. Engagement of switch contacts 77 and 79 with bridging contact 78 closes a circuit from the main power lines 118 and 119 through lead wires 80 and 83. Solenoid 81 is energized and closes valve 82 in the air supply line to a tube 238 which supplies air to the motor 13 which operates the valve 12. Since the air is thus prevented from escaping from the motor 13. the valve 12 must remain in closed position until the air-supply line 238 is again reopened.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. In a controller having a measuring instrument responsive to a variable to be controlled, a self-balancing potentiometer normally connected to said measuring instrument and having a rebalancing motor and a balancing resistance and a standardizing switch, an air-controlling pilot valve governed by the movements of said motor in response to the variations sensed by said measuring instrument and an air-operated motor controlled by the pilot valve, the combination including, periodically operating means for moving said standardizing switch to disconnect the measuring instrument and to connect a standard cell to said potentiometer, a clutch operated by said periodically operating means to connect said rebalancing resistance and said standard cell to said rebalancing motor when said standardizing switch is moved to standardizing position, a power-conducting circuit adapted for connection to a source of power, a circuit-making-and-breaking-device controlling the flow of power through said power-conducting circuit, said device being moved to render said circuit power-conducting when the standardizing switch is moved to standardizing position, a power-operated motor connected in said circuit and normally having a first position and operative to a second position when said circuit is conducting power, and a valve driven by said motor to closed position when said motor is in the second position, said valve being located in the air-conducting connection to the air-operated motor so as to prevent the entrance or exit of air to or from said air-operated motor when said valve is closed.

2. An interlock between the standardizing switch of a self-balancing electric potentiometer and an air-operated motor for operating a final control element under the control of said potentiometer, which interlock includes, a valve controlling the inlet and exhaust of air to said air-operated motor for operating a final control element, an electric motor having operative engagement with said valve, an electric circuit including said electric motor and adapted for connection to a source of electricity, relatively stationary switch contacts, a movable switch contact movable with the standardizing switch of the potentiometer to connect said stationary contacts into said electric circuit when the standardizing switch is moved to standardizing position, a rebalancing motor forming part of said potentiometer, a standardizing resistance forming part of said potentiometer, a normally disengaged clutch operatively located between said rebalancing motor and said standardizing resistance, and means for periodically engaging said clutch and causing said movable and stationary switch contacts to engage to thereby cause said rebalancing motor to move said standardizing resistance to balanced position.

3. In a controller having a measuring instrument responsive to a variable to be controlled, a self-balancing potentiometer normally connected to said measuring instrument and having a standardizing resistance and a standardizing switch, an air-controlling pilot valve governed by the movements of said potentiometer in response to the variations sensed by said measuring instrument and an air-operated motor controlled by the pilot valve, the combination including, operating means for moving said standardizing switch to disconnect the measuring instrument and to connect a standard cell to said potentiometer, a clutch operated by said operating means to connect said standardizing resistance to said operating means when said standardizing switch is moved to standardizing position, a power-conducting circuit adapted for connection to a source of power, a circuit-making-and-breaking device controlling the flow of power through said power-conducting circuit, said device being moved to render said circuit power-conducting when the standardizing switch is moved to a standardizing position, a power-operated motor connected in said circuit and normally having a first position and operative to a second position when said circuit is conducting power, and a valve driven by said motor to closed position when said motor is in the second position, said valve being located in the air-conducting connection to the air-operated motor so as to prevent the entrance or exit of air to or from said air-operated motor when said valve is closed.

HENRY M. SCHMITT.

REFERENCES CITED

The following references are of record in the file of this patent:

UNITED STATES PATENTS

| Number | Name | Date |
|---|---|---|
| 2,080,789 | Ryder | May 18, 1937 |
| 2,301,898 | Luhrs | Nov. 10, 1942 |
| 2,390,902 | Vollrath | Dec. 11, 1945 |
| 2,423,479 | Caldwell | July 8, 1947 |